United States Patent [19]

Taylor

[11] 3,853,488
[45] Dec. 10, 1974

[54] PROCESSING OF CALCIUM CARBONATES
[75] Inventor: Martin Taylor, St. Austell, England
[73] Assignee: English Clays Lovering Pochin & Company Limited, Cornwall, England
[22] Filed: May 1, 1972
[21] Appl. No.: 249,004

[30] Foreign Application Priority Data
May 7, 1971 Great Britain............... 13835/71

[52] U.S. Cl............. 23/293 A, 23/304, 23/313 R, 423/155, 423/173, 423/430
[51] Int. Cl. ........................................ C01f 11/18
[58] Field of Search ......... 23/293, 304, 313, 293 A; 423/159, 155, 160, 161, 430, 637, 173

[56] References Cited
UNITED STATES PATENTS

| 601,007 | 3/1898 | Stureke | 423/159 |
|---|---|---|---|
| 2,080,883 | /1937 | Wood | 423/637 |
| 2,107,215 | 2/1938 | Rembert | 23/313 |
| 2,956,867 | 10/1960 | Volk | 23/313 |

OTHER PUBLICATIONS

Azbe, Lime Manufacture, Rock Products, July, 1953, pp. 80, 85 and 86.

Primary Examiner—Wilbur L. Bascomb, Jr.
Assistant Examiner—S. J. Emery
Attorney, Agent, or Firm—Larson, Taylor & Hinds

[57] ABSTRACT

A method of treating a wet processed natural calcium carbonate to produce a bulk-handlable material in which the wet processed natural calcium carbonate is partially dewatered to obtain a superficially dry particulate material which is then subjected to mechanical working so that water is expressed from within the body of the particles to the surface thereof to obtain a moist material and mixed with a quantity of a dry or substantially dry powdered calcium carbonate sufficient to absorb the free surface water liberated from within the particles of calcium carbonate.

10 Claims, 1 Drawing Figure

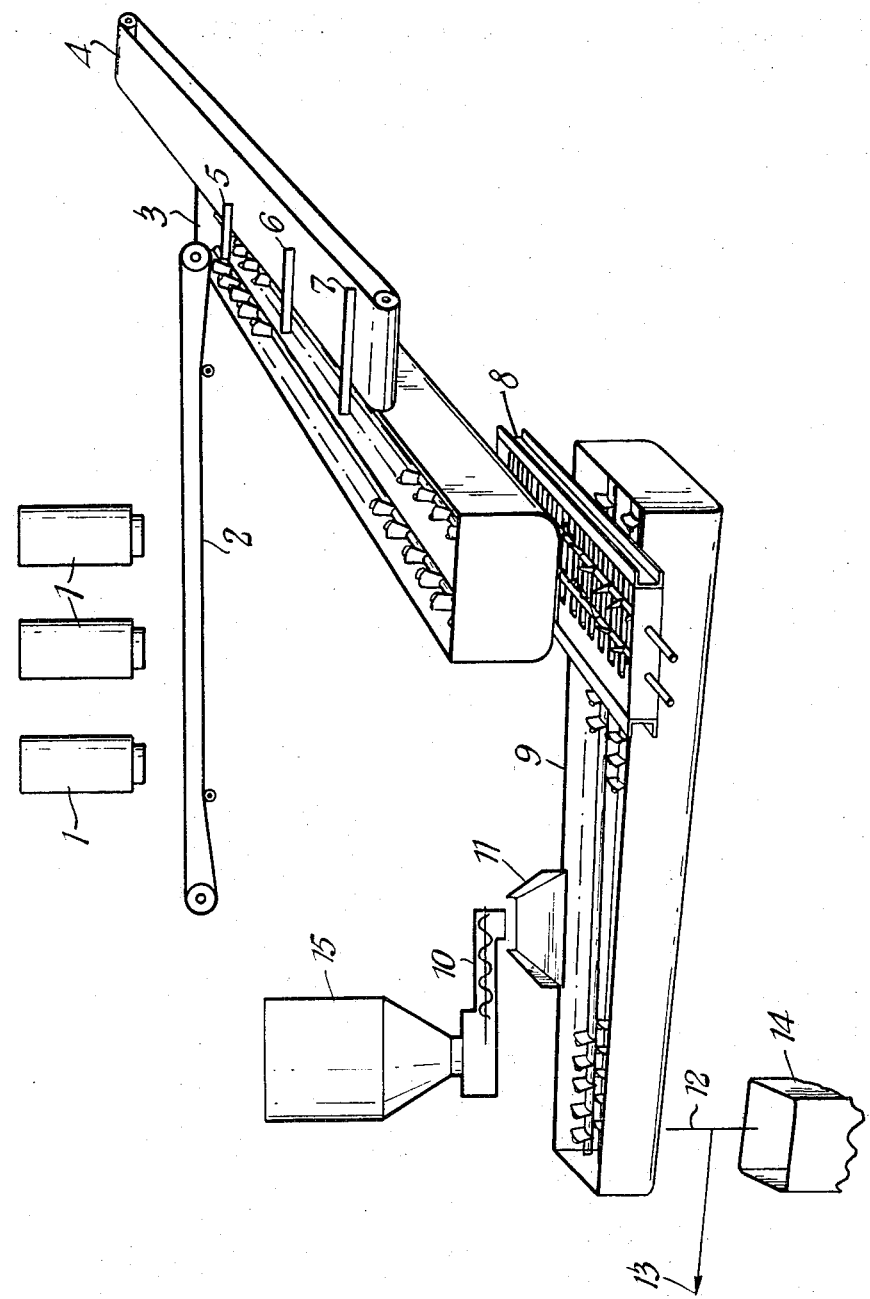

PROCESSING OF CALCIUM CARBONATES

BACKGROUND OF THE INVENTION

This invention relates to the processing of calcium carbonate.

Natural calcium carbonate is available in crude lump form, e.g., in the form of lumps of crude chalk or of crushed calcite marble, which contain certain undesirable impurities and require processing by the customer. Alternatively, crude natural calcium carbonate can be wet processed, i.e., treated in aqueous suspension to obtain a material having a desired degree of purity and/or particle size distribution, and then superficially dried and packed in bags or similar containers. However, it is well known that such containers while convenient when only small quantities of the product are required, are expensive to handle and transport when large quantities are involved.

Attempts to transport wet processed and superficially dried natural calcium carbonate in bulk are not wholly successful because of the ability of lumps of natural calcium carbonate to hold water which is released when the lumps are subjected to agitation. We have found that a batch of wet processed natural calcium carbonate after superficial drying contains about 17% by weight of water and appears dry to the eye and to the touch because the remaining water is held within the body of lumps of material, leaving the surface of the lumps relatively dry. However, when the material is subjected to agitation, such as occurs when it is transported in a road or rail vehicle, or pressure is applied to the material, for example as a result of the weight of upper layers of material bearing down on underlying layers, the water begins to exude from the surface of the lumps rendering the material very sticky with the result that considerable agglomeration of the material occurs during transit. If an attempt is made to dry a wet processed calcium carbonate directly to a smaller moisture content, and thus obtain a bulk-handlable product, it is found that considerable quantities of fine dust are produced which cause a serious nuisance when the material is being handled.

SUMMARY OF THE INVENTION

According to the present invention, there is provided a method of treating a wet processed natural calcium carbonate to produce a bulk-handlable material which method comprises the steps of:

a. partially dewatering the wet processed calcium carbonate to obtain a superficially dried material;

b. subjecting the partially dewatered calcium carbonate to mechanical working so that water is expressed from within the body of the lumps to the surface thereof to obtain a moist material; and c. mixing dry or substantially dry powdered calcium carbonate with the moist material in an amount sufficient to absorb the free surface water liberated from within the lumps of calcium carbonate.

It is possible to carry out steps b) and c) of the method of the invention simultaneously but advantageously step c) is begun after step b) has been started.

The wet processed calcium carbonate starting material is generally the product of a refining process in which a crude calcium carbonate is ground in an aqueous medium in order to reduce the mean particle size of the mineral and to liberate undesirable impurities. Frequently, a dispersing agent is added to the aqueous medium to deflocculate the mineral particles. The calcium carbonate in suspension may then be subjected to a particle size separation process, for example by gravitational or centrifugal sedimentation.

The partial dewatering of the wet processed calcium carbonate is preferably effected by means of a tube pressure filter of the type described in U.K. Patent Specification No. 1,240,465. Using such a tube pressure filter there can be obtained a filter cake having a moisture content of about 17–25% by weight. Other conventional methods of dewatering the wet processed calcium carbonate can be used.

The mechanical working of the partially dewatered calcium carbonate may be performed in a conventional solid mixer, for example a trough mixer, a ribbon mixer, a paddle mixer, a roller pan mixer or a dough mixer. The preferred type of mixer is a paddle mixer. Advantageously, the mechanical working is carried out under conditions which result in there being dissipated in the calcium carbonate material from 1 to about 50 horsepower hours of energy per ton of dry calcium carbonate ($2.5 \times 10^3$ to about $130 \times 10^3$ joules/Kilogram).

The dry or substantially dry powdered calcium carbonate which is mixed with the moist calcium carbonate material should contain not more than about 5% by weight, and preferably not more than 2% by weight, of water. If the dry, or substantially dry, powdered calcium carbonate contains more than about 5% by weight of water, it becomes difficult to handle and to meter. The dry or substantially dry calcium carbonate is advantageously added to the moist calcium carbonate material in the mixer in small quantities at a time. The amount of dry or substantially dry powdered calcium carbonate added to the moist calcium carbonate material will be such that the final moisture content of the mixture is in the range 10–16% by weight, preferably 13 to 16% by weight. The upper limit is critical in as much as at water contents above 16% by weight, the particles of calcium carbonate tend to agglomerate. The lower limit is determined by the amount of dust which can be tolerated in the final product. According to the initial moisture content of the moist calcium carbonate material it is found that there should be added to each 100 kg. of moist calcium carbonate material from 5 to 100 kg. of dry or substantially dry powdered calcium carbonate.

In one embodiment of the invention the partially dewatered calcium carbonate is added to a first mixer, or to an upstream region of a single mixer, and sufficient residence time is allowed, before any addition of dry or substantially dry material, for water to be forced to the surface of the lumps of partially dried material. The first of three additions of dry or substantially dry material is then made and sufficient residence time is allowed for the water on the surface of the partially dried material to be absorbed by the dry or substantially dry material and to bond the latter to the partially dried material, and for more water to be forced to the surface of the lumps. A second addition is then made in a second mixer, or in the central region of a single mixer, and a similar interval is observed before a third and final addition is made in a third mixer or in the downstream region of a single mixer. In this way substantially all the dust is absorbed by the partially dewatered material and the product tends to consist of lumps of substantially uniform size and moisture content.

In another embodiment of the invention part of the optimum quantity of dry or substantially dry powdered calcium carbonate is added to the moist material in a first mixer, the resultant mixture is then passed through apparatus which will break up any large lumps in the mixture, and finally the mixture is fed to a second mixer where the remainder of the dry or substantially dry powdered calcium carbonate is added. The apparatus for breaking up the large lumps can conveniently be a finger crusher, i.e., apparatus comprising a trough in the bottom portion of which there is a grid of parallel bars and one or more rotating horizontal shafts on which are mounted fingers or radiating pegs conveniently disposed in a helical pattern, the tips of the fingers projecting between the bars of the grid so as to force material placed in the trough through the grid. A convenient spacing for the bars of the grid has been found to be about ½ inch.

The product from the final mixer of a series of mixers or from the downstream region of a single mixer which is then in a bulk-handlable form may, if desired, be subjected to granulation in, for example, a pan-type or drum-type granulator in order to give a product having a more uniform particle size distribution.

A wet processed calcium carbonate which has been treated in accordance with the method of the invention to reduce its tendency to agglomerate is advantageously passed through suitable dividing means which separate off a proportion of the calcium carbonate for drying in a suitable drier, for example a heated impact mill, in order to form a dry or substantially dry powdered calcium carbonate for use in the treatment of a further quantity of wet processed calcium carbonate, the remainder which constitutes the major porportion of the treated product being passed to suitable bulk storage means to await transportation.

DESCRIPTION OF THE PREFERRED EMBODIMENTS

For a better understanding of the invention, and to show how the same may be carried into effect, reference will now be made, by way of example, to the accompanying drawing which shows a diagrammatic arrangement of apparatus for carrying out the method of the invention.

Referring to the accompanying drawing, a wet, processed natural calcium carbonate is partially dewatered in a battery of tube pressure filters 1 which are constructed as described in U.K. Specification No. 1,240,465. The filter cake produced in the tube pressure filters is discharged onto an endless conveyor belt 2 which deposits the cake in one end of a first paddle mixer 3. Dry or substantially dry powdered calcium carbonate is supplied by an endless conveyor 4 and is deflected into the paddle mixer by means of three deflector boards 5, 6 and 7. The boards 5, 6 and 7 span increasing portions of the total width of the conveyor belt so that board 5 deflects the material on the side of the belt near to the paddle mixer, board 6 deflects the material from the centre of the belt and board 7 deflects the material from the side of the belt remote from the paddle mixer. The calcium carbonate material is discharged from the end of the paddle mixer in lump form, having a moisture content of 17–18% by weight, through a finger crusher 8 into a second paddle mixer 9. A second portion of dry or substantially dry powdered calcium carbonate stored in a hopper 15 is supplied to the paddle mixer by means of a screw conveyor 10 which discharges into a distribution chute 11. The product is discharged from the paddle mixer 9 at a moisture content of 15% by weight and is split into two portions at 12, the larger portion being conveyed as the final product to bulk storage means at 13 and the smaller portion being passed to a feed chute 14 of a heated pulveriser mill which supplies the dry or substantially dry powdered calcium carbonate to the conveyor 5 and screw conveyor 10.

The invention is further illustrated by the following Examples, the process described in the Examples being carried out using apparatus as described above.

EXAMPLE 1

Crude natural chalk was wet processed by being ground in a pebble mill in water for 20 minutes in order to form a suspension of natural chalk particles containing 40% by weight of chalk and to free the chalk from particles of flint and other impurities. The particle size distribution of the chalk in suspension was found to be such that 38% by weight consisted of particles smaller than 2 $\mu$m equivalent spherical diameter, 6% by weight of particles larger than 10 $\mu$m equivalent spherical diameter and 0.02% by weight of particles larger than 53 $\mu$m. The chalk suspension was dewatered in a battery of six tube pressure filters, and the filter cake thus formed was found to have a moisture content of 18.1% by weight. The filter cake was fed to a first paddle mixer to which, for every 100 kg of filter cake, there was also supplied downstream of the feed of filter cake 17.5kg of powdered calcium carbonate having a moisture content of 1.0% by weight. The powdered calcium carbonate was supplied to the paddle mixer in three separate substantially equal quantities. The amount of energy dissipated in the calcium carbonate in the first paddle mixer was 12.5 horsepower hours of energy per ton of dry calcium carbonate (33 × 10$^3$ joules per kg). The mixture discharged from the first paddle mixer, having a moisture content in the range 15–16% by weight, was passed through a finger crusher which comprised a trough and a two parallel rotating shafts each with radial fingers arranged in a helix which forced the material through a grid in the bottom of the trough, the grid comprising parallel bars spaced at intervals of ½ in. The large lumps in the material were thus broken down and the material was then subjected to further mechanical working in a second paddle mixer to which was also added a further 11.7 kg of the dry powdered calcium carbonate for every 100 kg of the original filter cake. The amount of energy dissipated in the calcium carbonate in the second paddle mixer was 12.5 horsepower hours of energy per ton of dry calcium carbonate. On discharge from the second paddle mixer the material was found to have a moisture content of 14.2% by weight, to be in a bulk-handlable form which could be transported by road or rail without any appreciable agglomeration of the lumps of material, and to consist of lumps or granules having the following distribution of sizes:

| | % by weight |
| --- | --- |
| larger than 15.85 mm (⅝ B.S.S.)* | 6.7 |
| 9.42 – 15.85 mm (⅜" – ⅝" B.S.S.) | 23.0 |

-Continued

| | % by weight |
|---|---|
| 3.34 – 9.42 mm (No.5 – ⅜" B.S.S.) | 54.0 |
| 1.67 – 3.34 mm (No.10 – No.5 B.S.S.) | 10.4 |
| Smaller than 1.67 mm No.10 B.S.S.) | 6.0 |

*B.S.S. = British Standard Sieve

EXAMPLE 2

The process described in Example 1 was repeated except that the powdered calcium carbonate was fed to the first paddle mixer in one lot and at the same point as the filter cake. On discharge from the second paddle mixer the material was found to be more dusty and to possess a more uneven distribution of lump sizes than the product of Example 1.

EXAMPLE 3

The process described in Example 1 was repeated except that there was fed to the first paddle mixer 33.0 Kg of powdered calcium carbonate having a moisture content of 8.0% by weight for every 100 Kg of filter cake and to the second paddle mixer there was fed a further 27.3 Kg of the powdered calcium carbonate for every 100 Kg of the original filter cake. The quantities of powdered calcium carbonate added were those which would give the same moisture contents for the products discharged from the first and second paddle mixers as in Example 1. The powdered calcium carbonate having a moisture content of 8.0% by weight was found to be difficult to handle and to meter accurately into the paddel mixers and the final product was considerably less homogeneous than the product of Example 1.

EXAMPLE 4

The process described in Example 1 was repeated except that there was fed to the first paddle mixer in three substantially equal lots 4.1 Kg of powdered calcium carbonate having a moisture content of 1.0% by weight for every 100 Kg of filter cake. The moisture content of the mixture discharged from the first paddle mixer was in the range 17 – 18% by weight. There was added to the mixture in the second paddle mixer a further 2.8 Kg of the powdered calcium carbonate for every 100 Kg of the original filter cake. On discharge from the second paddle mixer the material was found to have a moisture content of 17.0% by weight and to be in a bulk-handlable form but when the material was transported in a lorry considerable agglomeration occurred.

I claim:
1. A method of treating a wet processed natural calcium carbonate to produce a bulk-handlable material which method comprises the steps of:
   a. partially dewatering the wet processed natural calcium carbonate to obtain a superficially dry particulate material containing from 17 to 25% by weight of water; and
   b. thereafter subjecting the partially dewatered calcium carbonate to mechanical working in a mixer so that water is expressed from within the body of the particles to the surface thereof and mixing additional powdered calcium carbonate containing not more than 5% by weight of water with the partially dewatered calcium carbonate in an amount sufficient to absorb the free surface water liberated from within the particles of calcium carbonate by said mechanical working to produce a bulk-handleable material containing 10 to 16% by weight of water.

2. A method according to claim 1, wherein the partially dewatered calcium carbonate is mechanically worked under conditions such that there is dissipated therein from 1 to about 50 horsepower hours of energy per ton of dry calcium carbonate.

3. A method according to claim 1, wherein the dry or substantially dry powdered calcium carbonate contains not more than 2% by weight of water.

4. A method according to claim 1, wherein the final moisture content of the mixture is in the range 13 to 16% by weight.

5. A method according to claim 1, wherein the mechanical working of the partially dewatered calcium carbonate is begun before there is mixed with the latter any of the dry or substantially dry calcium carbonate.

6. A method according to claim 1, wherein the wet processed calcium carbonate contains not more than 0.5% by weight of particles larger than 53 microns.

7. A method of treating a wet processed natural calcium carbonate to produce a bulk-handleable material which method comprises the steps of:
   a. partially dewatering the wet processed natural calcium carbonate to obtain a superficially dry particulate material containing from 17 to 25% by weight of water; and
   b. thereafter subjecting the partially dewatered calcium carbonate to mechanical work in a mixer until there has been dissipated in the partially dewatered calcium carbonate from 1 to about 50 horsepower hours of energy per ton of dry calcium carbonate, whereby water is expressed from within the body of the particles to the surface thereof and mixing with the partially dewatered calcium carbonate a quantity of additional powdered calcium carbonate containing not more than 5% by weight of water sufficient to absorb the free surface water liberated from within the particles of calcium carbonate and to produce a bulk-handlable material containing from 10 to 16% by weight of water.

8. A method according to claim 7, wherein the dry or substantially dry calcium carbonate contains not more than 2% by weight of water.

9. A method according to claim 7, wherein the mechanical working of the partially dewatered calcium carbonate is begun before there is mixed with the latter any of the dry or substantially dry calcium carbonate.

10. A method according to claim 7, wherein the wet processed calcium carbonate contains not more than 0.05% by weight of particles larger than 53 microns.

* * * * *